(12) United States Patent
Dawson et al.

(10) Patent No.: US 8,332,913 B2
(45) Date of Patent: Dec. 11, 2012

(54) FRAUD MITIGATION THROUGH AVATAR IDENTITY DETERMINATION

(75) Inventors: Christopher J. Dawson, Arlington, VA (US); Rick A. Hamilton, II, Charlottesville, VA (US); Jenny S. Li, Danbury, CT (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/045,757

(22) Filed: Mar. 11, 2008

(65) Prior Publication Data

US 2009/0235331 A1     Sep. 17, 2009

(51) Int. Cl.
*G06F 7/04* (2006.01)

(52) U.S. Cl. .................. 726/4; 726/17; 726/21; 726/26; 713/152; 713/168; 713/187; 713/189

(58) Field of Classification Search ........................ None
See application file for complete search history.

(56) References Cited

U.S. PATENT DOCUMENTS

| 5,802,296 | A | * | 9/1998 | Morse et al. | 709/208 |
| 2003/0014423 | A1 | * | 1/2003 | Chuah et al. | 707/102 |
| 2006/0128460 | A1 | | 6/2006 | Muir et al. | |
| 2007/0093299 | A1 | | 4/2007 | Bergeron et al. | |
| 2007/0243936 | A1 | | 10/2007 | Binenstock et al. | |
| 2008/0120376 | A1 | * | 5/2008 | Allsop | 709/204 |
| 2009/0150418 | A1 | * | 6/2009 | Shuster | 707/100 |

OTHER PUBLICATIONS

Langberg, "Virtual World There Innovative to an Extent" San Jose Mercury News, Nov. 2003, pp. 1-3.*
Geoff Duncan, "Second Life Rolls Out ID Verification", Aug. 2007, http://news.digitaltrends.com/news/story/14051/second_life_rolls_out_id_verification.

* cited by examiner

*Primary Examiner* — Shewaye Gelagay
(74) *Attorney, Agent, or Firm* — William E. Schiesser; Hoffman Warnick LLC

(57) ABSTRACT

The present invention relates to fraud mitigation in a virtual universe through avatar identity determination. A method in accordance with an embodiment of the present invention includes: correlating an avatar in the virtual universe with a user; determining if the user is controlling a plurality of avatars in the virtual universe; and taking an action if it is determined that the user is controlling a plurality of avatars in the virtual universe.

16 Claims, 3 Drawing Sheets

FRAUD MITIGATION THROUGH AVATAR IDENTITY DETERMINATION

FIELD OF THE INVENTION

The present invention relates to virtual universes, and more specifically relates to fraud mitigation through avatar identity determination.

BACKGROUND OF THE INVENTION

A virtual universe is an interactive simulated environment accessed by multiple users through an online interface. Users inhabit and interact in the virtual universe via avatars. This habitation usually is represented in the form of avatars, which are two or three-dimensional graphical representations of humanoids. There are many different types of virtual universes, however there are several features most virtual universes generally have in common:
A) Shared Space: the world allows many users to participate at once.
B) Graphical User Interface: the virtual universe depicts space visually, ranging in style from 2D "cartoon" imagery to more immersive 3D environments.
C) Immediacy: interaction takes place in real time.
D) Interactivity: the virtual universe allows users to alter, develop, build, or submit customized content.
E) Persistence: the virtual universe's existence continues regardless of whether individual users are logged in.
F) Socialization/Community: the virtual universe allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes, such as that provided in the on-line world Second Life (Second Life is a trademark of Linden Research in the United States, other countries, or both). The Second Life client program provides its users (also referred to as residents) with tools to view, navigate, and modify the Second Life world and participate in its virtual economy.

Second Life and other on-line virtual universes present a tremendous new outlet for both structured and unstructured virtual collaboration, gaming and exploration, as well as real-life simulations in virtual spaces. Unlike in the physical world, however, in a virtual universe a single user may be represented by multiple avatars simultaneously. This may provide a user with undue benefit, or may provide a user with the ability to be disruptive. One example is applicable to virtual retail stores where certain promotional items are restricted to a certain purchase limit per customer per day. In the case where one user controls multiple avatars, in this scenario the multiple avatars may exhaust store inventory, thus preventing other customers from taking advantage of the sale. This also limits the width of exposure for the sponsoring vendor. In another business scenario in which an item is being auctioned, a user who controls multiple buyer avatars (or an even worse case where the seller of the auction items poses as multiple buyers) can manipulate the situation to their advantage by artificially controlling the price. A further example is related to gaming in a virtual world. For instance, a user may gain an unfair advantage in a virtual game in which the user is controlling a plurality of avatars in the game.

Accordingly, there exists a need for a solution to address these and other deficiencies of the related art.

SUMMARY OF THE INVENTION

The present invention provides fraud mitigation through avatar identity determination. Various identifying data related to a user who is controlling an avatar is detected and a warning is provided to other users in the virtual universe if a single user is simultaneously controlling (or possibly controlling) more than one avatar. To this extent, the present invention imposes more balance and fairness in a virtual universe by ensuring that users are aware of other users who are (or may be) simultaneously controlling multiple avatars.

A first aspect of the present invention is directed to a method for fraud mitigation in a virtual universe, comprising: correlating an avatar in the virtual universe with a user; determining if the user is controlling a plurality of avatars in the virtual universe; and taking an action if it is determined that the user is controlling a plurality of avatars in the virtual universe.

A second aspect of the present invention is directed to a system for fraud mitigation in a virtual universe, comprising: a system for correlating an avatar in the virtual universe with a user; a system for determining if the user is controlling a plurality of avatars in the virtual universe; and a system for taking an action if it is determined that the user is controlling a plurality of avatars in the virtual universe.

A third aspect of the present invention is directed to a program product stored on a computer readable medium, which when executed, provides fraud mitigation in a virtual universe, the computer readable medium comprising program code for: correlating an avatar in the virtual universe with a user; determining if the user is controlling a plurality of avatars in the virtual universe; and taking an action if it is determined that the user is controlling a plurality of avatars in the virtual universe.

A fourth aspect of the present invention is directed to a method for deploying an application for fraud mitigation in a virtual universe, comprising: providing a computer infrastructure being operable to: correlate an avatar in the virtual universe with a user; determine if the user is controlling a plurality of avatars in the virtual universe; and take an action if it is determined that the user is controlling a plurality of avatars in the virtual universe.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
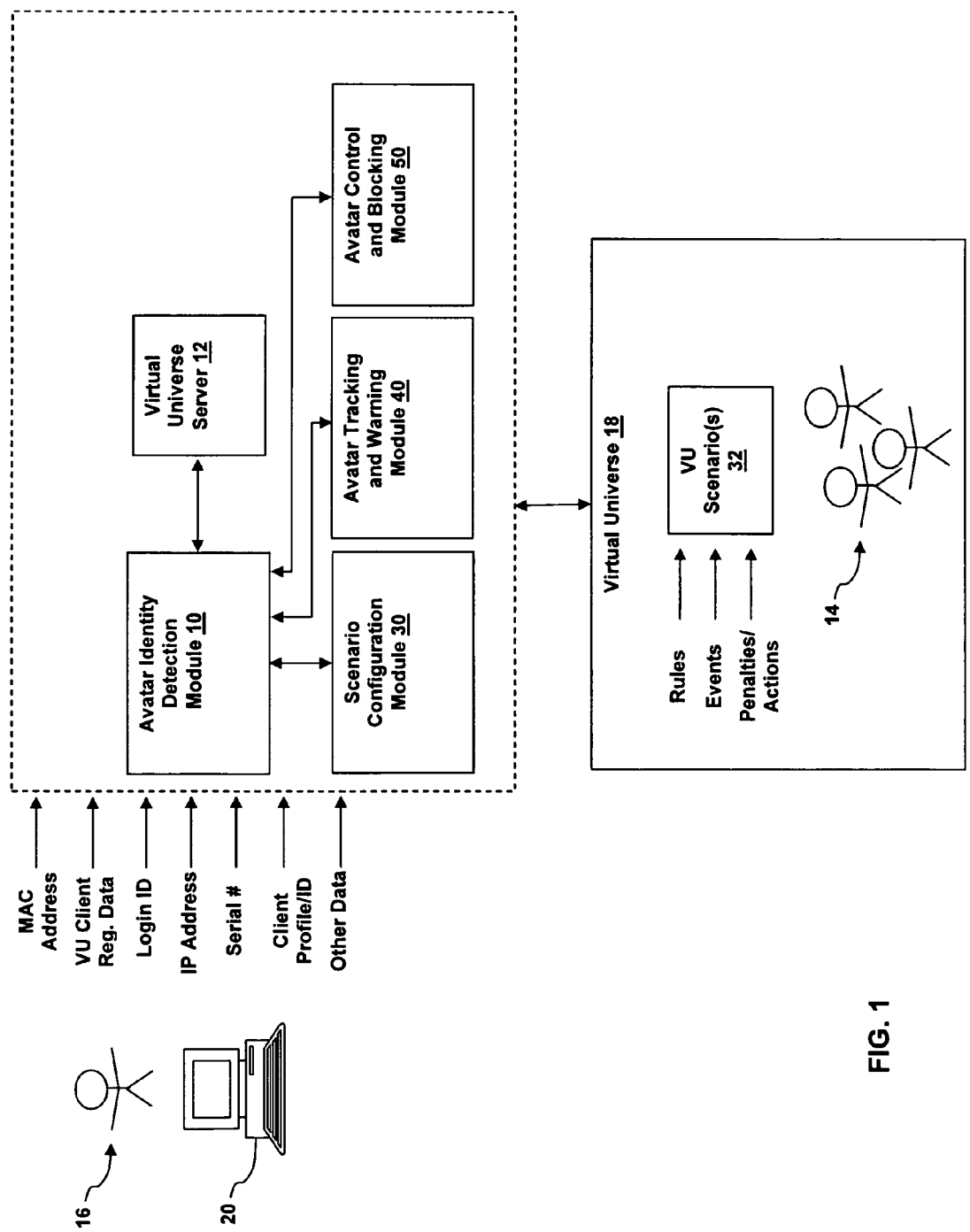
FIG. 1 depicts an illustrative system for fraud mitigation through avatar identity determination in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention relates to fraud mitigation through avatar identity determination.

As depicted in FIG. 1, the present invention provides an avatar identity detection module 10, which can operate on, or in concert with, a virtual universe (VU) server 12. The avatar identity detection module 10 is configured to identify and correlate an avatar 14 with a user 16 of a VU 18 through interrogation of the client computer 20 of the user 16, and to take appropriate action(s) if it determines that a single user 16 may be controlling multiple avatars 14.

Multiple techniques can be used alone or in various combinations by the avatar identity detection module 10 to make this correlation. For example, in an embodiment, the media access control (MAC) address (i.e., a static hardware address, tied to the machine upon which the client code is installed) of the client computer 20 is ascertained when a VU 18 session is initiated with the VU server 12, and that identifier is then associated with any avatars and objects originating from the client computer 20. As an example, if a user has a computer with a MAC address of 1A472, and controls avatars Jason Jay and Suzie Sue, the user's on-line identities within the virtual universe would be Jason Jay-1A472 and Suzie Sue-1A472, thus identifying the two avatars as having one controlling user.

In some cases, several independent users 16, each controlling a different avatar 14, may use a single client computer 20 to access the VU server 12. As such, using the above-described technique, multiple avatars 14 will be associated with the same MAC address. To address this situation, credible identification data (credit card information, for example) may be accepted in order to determine that the independent users 16 are not associated with another, even though their avatars 14 are associated with the same MAC address.

VU client registration data (e.g., name, address, phone number, credit card number, etc.) can also be used to correlate a user 16 with an avatar 14. The VU client registration data can be passed from the client computer 20 to the avatar identity detection module 10. Similar client registration data can be identified by the avatar identity detection module 10, indicating that a single user 16 may be controlling multiple avatars 14.

The login ID of a user 16 can also be used. For example, a user 16 may often maintain the same (or very similar) login ID on multiple servers for ease of management. As such, depending on the implementation of the VU code, a user 16 may be able to log on multiple times, using the same (or very similar) login ID. In this case, multiple uses of the same (or very similar) login ID can be identified by the avatar identity detection module 10, indicating that a single user 16 may be controlling multiple avatars 14.

An IP address or an IP address combined with other routing data can also be used by the avatar identity detection module 10. For example, it may be determined that multiple avatars 14 are controlled by client computers 20 whose IP addresses are sequential, or otherwise in a "like grouping." For instance, in a crowded "corporate announcement event," if twenty of the fifty avatars 14 present are all being controlled by client computers 20 at sequential IP addresses, a determination can be made by the avatar identity detection module 10 that the avatars 14 are probably either controlled by the same user 16, or by users 16 acting in concert.

Similar to the MAC address scenario described above, a client computer serial number can be used by the avatar identity detection module 10. This may have certain advantages, particularly when a client computer 20 is "multi-homed," (i.e., it has multiple network interface cards). In this case, the client computer serial number can still be used by the avatar identity detection module 10 to ascertain when a single client computer 20 is controlling multiple avatars 14.

Client profile/identification data apart from a login ID can also be used by the avatar identity detection module 10 to determine that a single user 16 may be controlling multiple avatars 14. Further, other collected and/or cached data, whether operating system registration or other identifiers, may likewise be used. Such data may be used in various forms or file formats upon the client computer 20, and can be provided to the avatar identity detection module 10.

The present invention also includes a scenario configuration module 30, which provides a user 16 with specific VU scenarios 32 that have been pre-configured to prevent a single user 16 from controlling multiple avatars 14. The scenario configuration module 30 can operate on, or in concert with, the VU server 12. Rules, events, and penalties/actions can be set for each VU scenario 32. In response to an occurrence of a predetermined event in a VU scenario 32, the scenario configuration module 30 invokes the avatar identity detection module 10 to detect the identity of any users 16 that may be controlling multiple avatars 14. Penalties and/or actions are taken against a user 16 that has been identified by the avatar identity detection module 10 as controlling multiple avatars 14.

Figure 2:
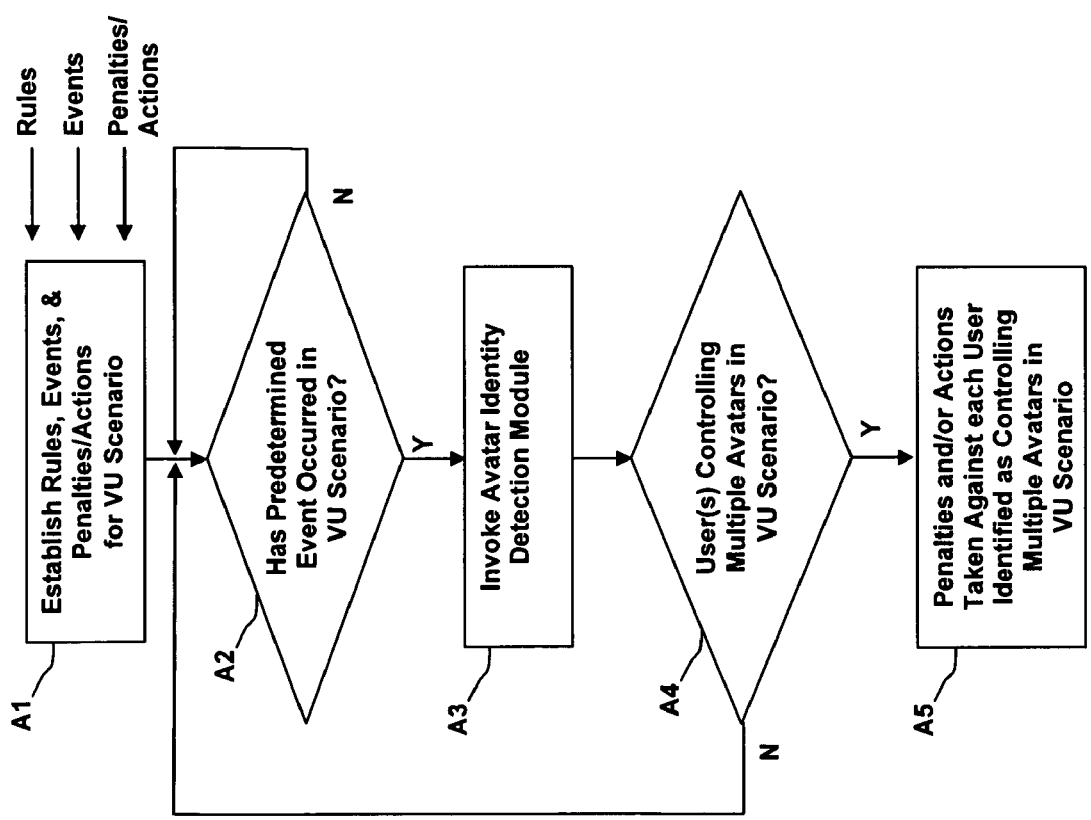
FIG. 2 depicts an illustrative flow diagram depicting the operation of a scenario configuration module in accordance with an embodiment of the present invention.

An illustrative flow diagram depicting the operation of the scenario configuration module 30 is depicted in FIG. 2. In A1, one or more rules, events, and penalties/actions are established for a given VU scenario 32. In A2, if an occurrence of a predetermined event in the VU scenario 32 is detected by the scenario configuration module 30 (YES, A2), then the avatar identity detection module 10 is invoked in A3. If not (NO, A2), A2 is repeated. If the avatar identity detection module 10 determines in A4 that one or more users 16 are controlling multiple avatars 14 in the VU scenario 32 (YES, A4), then the penalties and/or actions provided in A1 for the VU scenario 32 are taken in A5 against each user 16 that has been identified by the avatar identity detection module 10 as controlling multiple avatars 14. Otherwise (NO, A4), flow passes back to A2.

Examples of several VU scenarios 32 are described below.

Casinos
A) Rules: Each avatar 14 at any card table must be controlled by a unique user 16.
B) Event that triggers avatar identity detection: The avatar identity detection module 10 checks the identity of each user 16 controlling an avatar 14 seated at any card table.
C) Penalty/Action: Multiple avatars 14 that are controlled by the same user 16 would be prohibited from playing in the same card game. Either all of the avatars 14 that are controlled by the same user 16 are forced to leave, or only one of them is allowed to play.

Auction or Selling Event
A) Rules: The user 16 who sells an item cannot be a potential buyer.
B) Event that triggers avatar identity detection: The avatar identity detection module 10 checks the identity of all registered potential buyers upon auction registration.
C) Penalty/Action: A user 16 may be disqualified from selling the item, forced to obey the rules, and/or flagged as banned as a seller in the future.

Purchase of Promotional Items
A) Rules: Each avatar 14 must be controlled by a unique user 16 for the purchase of promotional items that have a quantity limit.
B) Event that triggers avatar identity detection: At the beginning of each transaction by an avatar 14, the avatar identity detection module 10 checks the identity of the user 16 controlling the avatar 14 prior to completion of the transaction.

C) Penalty/Action: If a user 16 controls multiple avatars 14 who are purchasing the promotional item, then only the first avatar 14 is allowed to make the purchase.

Contests

A) Rules: Each contestant avatar 14 should be represented by a unique user 16 to ensure fairness of the contest.
B) Event that triggers avatar identity detection: The avatar identity detection module 10 checks the identity of the user 16 controlling each contestant avatar 14.
C) Penalty: Multiple avatars 14 who are controlled by a single user 16 will all be disqualified when detected.

Marketing Research Events:

A) Rules: Any events that relate to collecting feedback or opinions from an audience, including polls about certain new products, or demonstrations, or any other possible feedback gathering events, should involve avatars that are each controlled by a unique user 16.
B) Event that triggers avatar identity detection: Each avatar 14 has to provide the name of his/her controlling user 16 to submit to the poll or opinion, even though his/her name will not be disclosed.
C) Penalty: Any feedback provided by multiple avatars 14 controlled by the same user 16 are not used.

Business Meetings

A) Rules: Each avatar 14 invited to a meeting should be controlled by a unique user 16.
B) Event that triggers avatar identity detection: The avatar identity detection module 10 checks the identity of the user 16 controlling each invited avatar 14 upon signing in to the meeting.
C) Penalty: If a user 16 controls multiple avatars 14, only one of the avatars 14 is allowed to attend the meeting.

Potential Danger

A) Rules: Multiple avatars 16 who are controlled by the same user 16 are not allowed to be located within a certain square footage of an area, or cannot interact with each other.
B) Event that triggers avatar identity detection: A list of the avatars 14 that are within a particular watch zone (a defined distance in radius) is monitored. The avatar identity detection module 10 checks the identity of the user 16 controlling each avatar 14 entering the watch zone.
C) Penalty: All but one of the multiple avatars 16 that are controlled by the same user 16 will be teleported to another area, or will have their rights to make any movement or interaction disabled.

In addition to the avatar identity detection module 10, the present invention can further include an avatar tracking and warning module 40 and an avatar control and blocking module 50. The avatar tracking and warning module 40 is configured to monitor each region of the VU 18 in order to detect suspicious login, teleport, or entry behavior within each region. Suspicious behavior can be defined, for example, as multiple avatars 14, controlled by the same user 16 (or by users 16 in concert), entering a specific region of the VU 18 (e.g., as detected by the avatar identity detection module 10). A visual warning or other type of indicator (e.g., audible warning, textual warning, etc.) can be displayed or otherwise suitably provided to other avatars 14 in the region of the VU 18 in response to the detection of suspicious avatar 14 behavior. Further, the abilities of the suspect avatars 14 can be limited in the region of the VU 18. For example, restrictions on speech, creation of objects, and/or other actions by the suspect avatars 14 in the region of the VU 18 can be invoked.

The avatar control and blocking module 50 acts as a gatekeeper to the VU 18, or specific region(s) within the VU 18. The avatar control and blocking module 50 can take action upon an avatar 14 (e.g., one of the plurality of avatars 14 that may be controlled by a single user 16), such as denying the avatar 14 permission to perform any specific/additional functions in the VU 18 and/or region(s) of the VU 18, removing the avatar 14 from a location within the VU 18, removing the avatar 14 from the entire VU 18, etc. Identity data for the avatar 14, such as the MAC address or other data used by the avatar identity detection module 10, can be maintained and can be used to potentially deny entry of the avatar 14 to the VU 18, block certain functions of the avatar 14 within the VU 18, deny access by the avatar 14 to specific regions within the VU 18, and/or the like.

Figure 3:
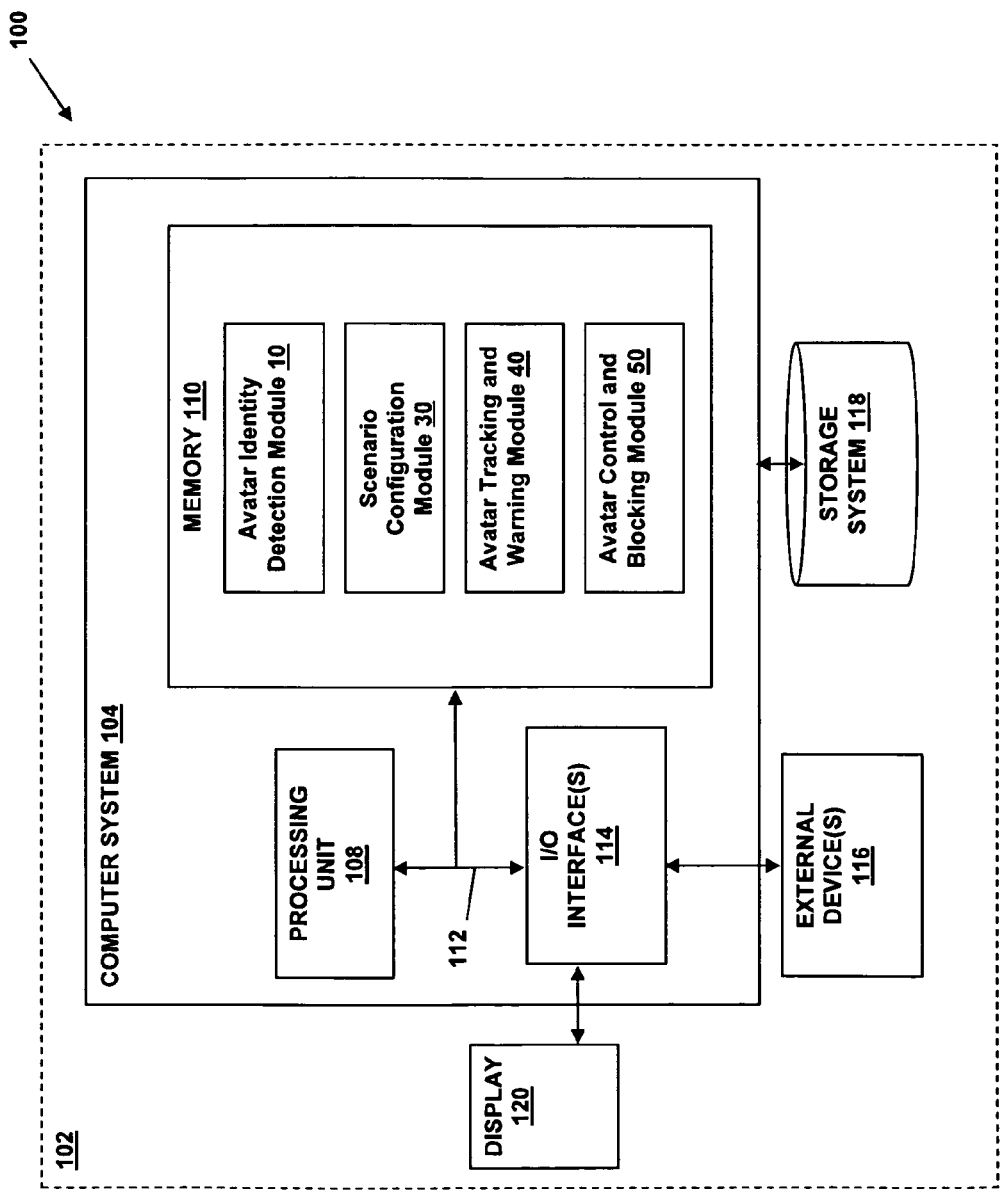
FIG. 3 depicts an illustrative computer system for implementing embodiment(s) of the present invention.

FIG. 3 depicts an illustrative system 100 for providing fraud mitigation through avatar identity determination in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as the avatar identity detection module 10, scenario configuration module 30, avatar tracking and warning module 40, and avatar control and blocking module 50, that are stored in memory 110 and/or storage system 118, and which operate in the manner discussed above. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 3 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method, comprising:
   performing fraud mitigation in a virtual universe using at least one computing device, wherein the performing of the fraud mitigation includes:
   correlating a first avatar in the virtual universe with a single, real-world user, wherein the single, real-world user directly controls actions of the first avatar in the virtual universe;
   correlating at least one of a plurality of avatars in the virtual universe with the single, real-world user, wherein the single, real-world user directly controls actions of the at least one of the plurality of avatars in the virtual universe;
   determining, using the at least one computing device, whether the single, real-world user is separately and directly controlling actions of the first avatar and the at least one of the plurality of avatars in the virtual universe, each of the at least one of the plurality of avatars distinct from the first avatar,
   wherein the at least one of the plurality of avatars and the first avatar are concurrently acting in the virtual universe; and
   performing a fraud mitigation action in response to determining that the single, real-world user is separately and directly controlling the actions of the first avatar and the at least one of the plurality of avatars in the virtual universe,
   wherein the performing of the fraud mitigation action includes at least one of:
   penalizing at least one of the first avatar, the at least one of the plurality of distinct avatars, or the single, real-world user, or
   notifying at least one other user of the virtual universe that the actions of the first avatar and the at least one of the plurality of avatars are being controlled by the single, real-world user,
   wherein the correlating of the first avatar and the at least one of the plurality of avatars in the virtual universe with the single, real-world user, further comprises: interrogating a client computer of the single, real-world user for data associated with the single, real-world user, and
   wherein the data associated with the single, real-world user comprises: at least one of a media access control address; an IP address; and a client computer serial number and at least one of: a virtual universe client registration data; a login ID; and profile or identification data.

2. The method of claim 1, wherein the penalizing comprises at least one of:
   prohibiting the at least one of the plurality of avatars from participating in an activity;
   removing the at least one of the plurality of avatars from a location within the virtual universe;
   restricting movement of the at least one of the plurality of avatars within the virtual universe; or
   restricting at least one capability of the at least one of the plurality of avatars in the virtual universe.

3. The method of claim 1, wherein the performing fraud mitigation further comprising:
   providing at least one scenario in the virtual universe configured to prevent the single, real-world user from controlling the at least one of the plurality of avatars.

4. The method of claim 3, wherein each scenario comprises:
   at least one rule;
   at least one event; and
   at least one penalty or at least one of the fraud mitigation actions performed against the single, real-world user that is controlling the at least one of the plurality of avatars in the scenario.

5. The method of claim 1, wherein the first avatar and the at least one of the plurality of avatars are configured to independently interact with one another within the virtual universe based upon the single, real-world user's direct and distinct control of the respective avatars.

6. A computer system comprising:
at least one computing device configured to provide fraud mitigation in a virtual universe, by performing fraud mitigation actions including:
correlating a first avatar in the virtual universe with a single, real-world user, wherein the single, real-world user directly controls actions of the first avatar in the virtual universe;
correlating at least one of a plurality of avatars in the virtual universe with the single, real-world user, wherein the single, real-world user directly controls actions of the at least one of the plurality of avatars in the virtual universe;
determining whether the single, real-world user is separately and directly controlling actions of the first avatar and the at least one of the plurality of avatars in the virtual universe, each of the at least one of the plurality of avatars distinct from the first avatar,
wherein the at least one of the plurality of avatars and the first avatar are concurrently acting in the virtual universe; and
performing a fraud mitigation action in response to determining that the single, real-world user is separately and directly controlling the actions of the first avatar and the at least one of the plurality of avatars in the virtual universe,
wherein the performing of the fraud mitigation action includes at least one of:
penalizing at least one of the first avatar, the at least one of the plurality of distinct avatars, or the single, real-world user, or
notifying at least one other user of the virtual universe that the actions of the first avatar and the at least one of the plurality of avatars are being controlled by the single, real-world user,
wherein the correlating of the first avatar and the at least one of the plurality of avatars in the virtual universe with the single, real-world user, further comprises: interrogating a client computer of the single, real-world user for data associated with the single, real-world user, and
wherein the data associated with the single, real-world user comprises: at least one of a media access control address; an IP address; and a client computer serial number and at least one of: a virtual universe client registration data; a login ID; and profile or identification data.

7. The computer system of claim 6, wherein the penalizing comprises at least one of:
prohibiting the at least one of the plurality of avatars from participating in an activity;
removing the at least one of the plurality of avatars from a location within the virtual universe;
restricting movement of the at least one of the plurality of avatars within the virtual universe; or
restricting at least one capability of the at least one of the plurality of avatars in the virtual universe.

8. The computer system of claim 6, wherein the performing of the fraud mitigation action further comprising:
providing at least one scenario in the virtual universe configured to prevent the single, real-world user from controlling the at least one of the plurality of avatars.

9. The computer system of claim 8, wherein each scenario comprises:
at least one rule;
at least one event; and
at least one penalty or at least one of the fraud mitigation actions performed against the single, real-world user that is controlling the at least one of the plurality of avatars in the scenario.

10. The computer system of claim 6, wherein the performing of the fraud mitigation action further comprising:
monitoring at least one region in the virtual universe for suspicious behavior associated with the single, real-world user controlling the at least one of the plurality of avatars; and
performing the fraud mitigation action against the single, real-world user in response to detecting suspicious behavior.

11. A program product stored on a non-transitory computer readable medium having program code, which when executed by a processor, performs actions including:
providing fraud mitigation in a virtual universe by:
correlating a first avatar in the virtual universe with a single, real-world user, wherein the single, real-world user directly controls actions of the first avatar in the virtual universe;
correlating at least one of a plurality of avatars in the virtual universe with the single, real-world user, wherein the single, real-world user directly controls actions of the at least one of the plurality of avatars in the virtual universe;
determining, using the at least one computing device, whether the single, real-world user is separately and directly controlling actions of the first avatar and the at least one of the plurality of avatars in the virtual universe, each of the at least one of the plurality of avatars distinct from the first avatar,
wherein the at least one of the plurality of avatars and the first avatar are concurrently acting in the virtual universe; and
performing a fraud mitigation action in response to determining that the single, real-world user is separately and directly controlling the actions of the first avatar and the at least one of the plurality of avatars in the virtual universe,
wherein the performing of the fraud mitigation action includes at least one of:
penalizing at least one of the first avatar, the at least one of the plurality of distinct avatars, or the single, real-world user, or
notifying at least one other user of the virtual universe that the actions of the first avatar and the at least one of the plurality of avatars are being controlled by the single, real-world user,
wherein the correlating of the first avatar and the at least one of the plurality of avatars in the virtual universe with the single, real-world user, further comprises: interrogating a client computer of the single, real-world user for data associated with the single, real-world user, and
wherein the data associated with the single, real-world user comprises: at least one of a media access control address; an IP address; and a client computer serial number and at least one of: a virtual universe client registration data; a login ID; and profile or identification data.

12. The program product of claim 11, wherein the penalizing further comprises at least one of:
prohibiting the at least one of the plurality of avatars from participating in an activity;
removing the at least one of the plurality of avatars from a location within the virtual universe;
restricting movement of the at least one of the plurality of avatars within the virtual universe; or
restricting at least one capability of the at least one of the plurality of avatars in the virtual universe.

13. The program product of claim 11, wherein the providing fraud mitigation further comprising:
providing at least one scenario in the virtual universe that is configured to prevent the single, real-world user from controlling the at least one of the plurality of avatars.

14. The program product of claim 13, wherein each scenario comprises:
at least one rule;
at least one event; and
at least one penalty or at least one of the fraud mitigation actions performed against the single, real-world user that is controlling the at least one of the plurality of avatars in the scenario.

15. The program product of claim 11, wherein the providing fraud mitigation further comprising:
monitoring at least one region in the virtual universe for suspicious behavior associated with the single, real-world user controlling the at least one of the plurality of avatars; and
performing the fraud mitigation action against the single, real-world user in response to detecting suspicious behavior.

16. A method for deploying an application for fraud mitigation in a virtual universe, comprising:
providing a computer infrastructure being operable to:
correlate a first avatar in the virtual universe with a single, real-world user, wherein the single, real-world user directly controls actions of the first avatar in the virtual universe;
correlate at least one of a plurality of avatars in the virtual universe with the single, real-world user, wherein the single, real-world user directly controls actions of the at least one of the plurality of avatars in the virtual universe;
determine whether the single, real-world user is separately and directly controlling actions of the first avatar and the at least one of the plurality of avatars in the virtual universe, each of the at least one of the plurality of avatars distinct from the first avatar,
wherein the at least one of the plurality of avatars and the first avatar are concurrently acting in the virtual universe; and
perform a fraud mitigation action in response to determining that the single, real-world user is separately and directly controlling the actions of the first avatar and the at least one of the plurality of avatars in the virtual universe,
wherein the performing of the fraud mitigation action includes at least one of:
penalizing at least one of the first avatar, the at least one of the plurality of distinct avatars, or the single, real-world user, or
notifying at least one other user of the virtual universe that the actions of the first avatar and the at least one of the plurality of avatars are being controlled by the single, real-world user,
wherein correlating of the first avatar and the at least one of the plurality of avatars in the virtual universe with the single, real-world user, further comprises: interrogating a client computer of the single, real-world user for data associated with the single, real-world user, and
wherein the data associated with the single, real-world user comprises: at least one of a media access control address; an IP address; and a client computer serial number and at least one of: a virtual universe client registration data; a login ID; and profile or identification data.

* * * * *